(12) United States Patent
Shkel (10) Patent No.: US 6,910,385 B2
(45) Date of Patent: Jun. 28, 2005

(54) SELF-SENSING SOLID-STATE SENSOR

(75) Inventor: Yuri M. Shkel, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 114 days.

(21) Appl. No.: 10/198,410

(22) Filed: Jul. 18, 2002

(65) Prior Publication Data

US 2003/0164048 A1 Sep. 4, 2003

Related U.S. Application Data

(60) Provisional application No. 60/360,856, filed on Mar. 1, 2002.

(51) Int. Cl.$^7$ ................................................ G01L 1/00
(52) U.S. Cl. ...................................................... 73/780
(58) Field of Search .......................... 73/780, 781, 774, 73/763

(56) References Cited

U.S. PATENT DOCUMENTS

| | | | |
|---|---|---|---|
| 4,649,759 A | | 3/1987 | Lee ........................... 73/862.64 |
| 4,939,930 A | | 7/1990 | Ishizuki et al. ............... 73/780 |
| 5,747,698 A | * | 5/1998 | Spillman et al. ............... 73/780 |
| 5,880,924 A | * | 3/1999 | Kumar et al. ................. 361/234 |
| 6,441,449 B1 | * | 8/2002 | Xu et al. ..................... 257/414 |
| 6,588,672 B1 | * | 7/2003 | Usami ......................... 235/492 |

OTHER PUBLICATIONS

Sensors—2000—*Measuring with Light*, by P. L. Fuhr.
*High Strain Actuator Materials Based on Dielectric Elastomers*, by R. Pelrine, R. Kornbluh and G. Kofod.

* cited by examiner

*Primary Examiner*—Harshad Patel
*Assistant Examiner*—Corey D. Mack
(74) *Attorney, Agent, or Firm*—Boyle Fredrickson Newholm Stein & Gratz S.C.

(57) ABSTRACT

An apparatus and method directed to a solid-state capacitance sensor for measuring a strain force on a dielectric having a corresponding dielectric constant includes at least one pair of electrodes disposed so as to interface with the dielectric. The sensor preferably includes a measuring circuit coupled to the electrodes to measure a change in the dielectric constant in response to the force. In operation, the change in the dielectric constant is caused by an electrostrictive response of the dielectric upon deformation. Preferably, the response is quantified by computing a change in the dielectric constant based on a measured change in capacitance. The electrodes may be fixed to the dielectric, and the measuring circuit determines the change in the dielectric constant by measuring a change in capacitance between the pair of electrodes and then computing the change in the dielectric constant. The force can then be computed based on both the change in dielectric constant and the electrostriction parameters associated with the dielectric.

32 Claims, 6 Drawing Sheets

SELF-SENSING SOLID-STATE SENSOR

CROSS-REFERENCE TO RELATED APPLICATION

This application claims priority from corresponding provisional application U.S. Ser. No. 60/360,856 filed on Mar. 1, 2002, which is expressly incorporated herein by reference.

BACKGROUND OF THE INVENTION

1. Field of the Invention

The present invention is directed to strain sensors, and more particularly, a solid-state sensor that detects strain based on the electrostrictive response of the corresponding dielectric.

2. Description of Related Art

Strain gauges or sensors have been employed in a wide variety of applications. Conventional strain sensors are typically used for measuring the expansion and/or contraction of an object under stress. A common type of strain sensor comprises a resistive transducer. Other types of strain sensors include air-gap capacitive sensors, piezo resistors, silicon strain gauges, piezoelectric devices such as lead zirconium-titanate (PZT), capacitors formed of inter-digitative fingers that simulate adjacent parallel capacitors, conductive elastomer resistive strain gauges, as well as others.

Resistive strain sensors generate an electric output that is proportional to the amount the object being measured is deformed under strain. In one type of resistive strain sensor, the sensor is made of a metal foil or metal wire that is mounted on a substrate. In operation, the resistance of the wire changes with expansion or contraction of the object it is mounted on in a predetermined direction. Such a sensor requires either a DC or an AC excitation voltage to generate a strain signal. In addition, auxiliary equipment (for example, connecting the sensor in a differential arrangement such as in a wheatstone bridge circuit); typically must be provided to accurately determine the amount of strain.

Figure 1A:
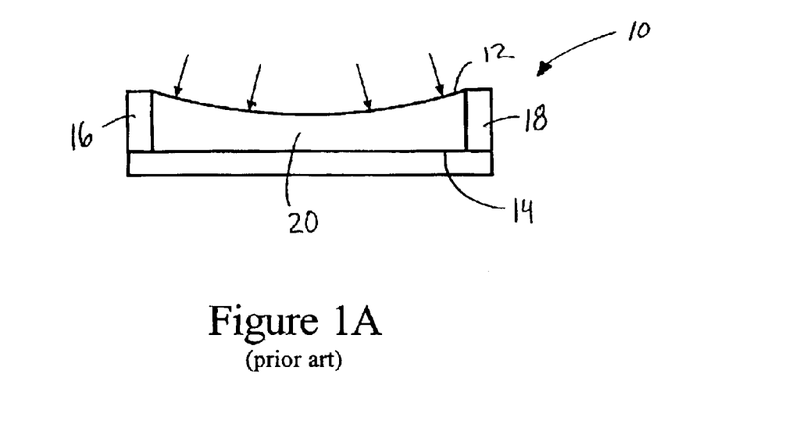
FIGS. 1A and 1B are prior art air gap capacitive sensors.
Figure 1B:
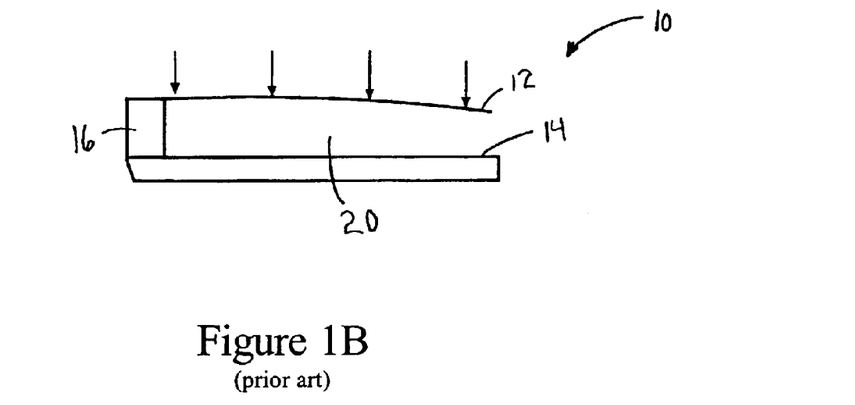

Capacitance strain gauges, such as those shown in FIGS. 1A and 1B, depend on geometric features of the gauge to measure strain. In FIG. 1A, a capacitance strain sensor 10 includes opposed parallel plates 12, 14 separated by a pair of spacers 16, 18, which collectively define an air gap 20. Or, as shown in FIG. 1B, a capacitance strain sensor 22 may include a single spacer 18 to separate the opposed plates 12, 14, which may be preferred depending on the type of forces being sensed or required mounting configuration. As a compressive load is applied to the sensor, as shown, the separation between the opposed plates changes (e.g., narrows as shown in FIGS. 1A and 1B when subjected to a compressive load), thus causing a change in capacitance. In particular, capacitance, C, of a parallel plate capacitor can be characterized as being proportional to A×K/h where A is the plate area, K is the dielectric constant and "h" is the separation between the plates. As a result, the capacitance can be varied by changing the plate area, A, or the gap, h. The electrical properties of the materials used to form the sensor are generally unimportant, so the capacitance strain gauge materials can be chosen to meet the mechanical requirements of the particular application. Therefore, such sensors are useful in those instances where a more rugged sensor is needed, providing a significant advantage over resistance strain gauges. However, as discussed below, such sensors have drawbacks of their own.

Figure 2:
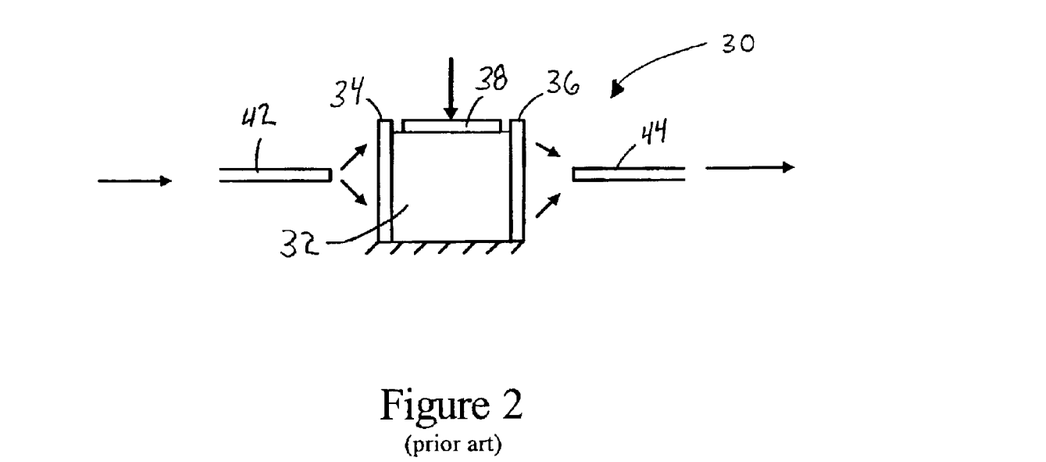
FIG. 2 is a prior art strain sensor that alters the polarization of light passing therethrough in response to strain forces.

Another type of sensor uses birefringence to detect strain forces. More particularly, such sensors operate on the principal that electromagnetic field waves in a deformed material can be subdivided into an amount of the field along one linear axis, and an amount of the field along another linear axis that is orthogonal to the first axis. The resulting two components of the electromagnetic wave are referred to as the perpendicular and parallel polarizations and thus these sensors are often called polarization sensors. Such polarization sensors comprise a sub-class of intensity sensing, whereby the sensor manipulates (in this case, rotates) the optical field's polarization state. In one implementation, the polarization sensor includes an optical analyzer to determine the amount of rotation that the field has undergone. For example, as shown in FIG. 2, a pressure sensor 30 utilizes the polarization effect on light intensity. Sensor 30 employs a photo-elastic material 32 that is sandwiched between a pair of parallel polarizer 34, 36. A compression plate 38 is disposed intermediate the polarizers, generally orthogonal thereto and acts as an interface to the object being measured (not shown), transferring forces acting on the object being measured to photo-elastic element 32. As pressure is applied to plate 38, plate 38 compresses the compliant photo-elastic element 32, thus altering the polarization of the light passing therethrough, and thus allowing a sensor 30 to quantify the amount of strain force based on changes in light intensity caused by polarization.

More particularly, in operation, input light provided by a fiber optic 42 impinges upon first polarizer 34 and the polarized light is transmitted to photo-elastic element 32. Element 32 then rotates the polarization state as the external pressure changes. The polarized light then impinges upon second polarizer 36 (which, when used in this configuration, is called an analyzer) designed to transmit light of only a certain polarization rotation to an output fiber optic 44. With no pressure applied, there is no polarization rotation, and hence the maximum field intensity emerges from the analyzer. As the pressure increases, more and more polarization rotation occurs, thus causing a decrease in the intensity of the light emerging from the analyzer. This intensity is quantified in conventional fashion to provide a measure of the strain force.

Although useful for certain applications, each of the above-described sensors has inherent problems. Resistive strain sensors require relatively complex measurement equipment (e.g., a wheatstone bridge), and can have less than ideal robustness. Moreover, resistive strain gauges dissipate a significant amount of heat, thus making their implementation impractical for many applications contemplated by the present invention including, for example, when the sensor is embedded with the object being sensed. Conventional capacitance strain gauges, although more robust than resistance strain gauges, are limited by the range of forces they can sense. For instance, measuring shear forces with a conventional capacitance sensor is difficult. Moreover, conventional air-gap capacitance strain sensors are not sufficiently sensitive for the applications contemplated by the present invention and, in any event, are vulnerable to overload in the presence of large forces, thus further limiting their application.

Piezoelectric sensors tend to be expensive and they are limited by the types of specialized materials that exhibit piezoelectric characteristics. Further, such piezoelectric-based devices are limited in their range of applications due to their relatively poor mechanical properties which limit the strain forces they can sense. Moreover, piezoelectric-based devices are typically made of brittle materials, have low material tensile strength and are operable only over a limited temperature range. Piezo-resistant wire sensors, on the other hand, typically require extremely sure mechanical contact, which can severely limit their use in many applications where a strong mechanical contact is difficult to establish and maintain. Known polarization sensors, such as that described in conjunction with FIG. 2, typically require that a substantial number of components (including polarizers, a light source, an interface, etc.) must be mechanically coupled to the object being sensed, thus adding to system cost and compromising overall robustness of the sensor. Moreover, because such sensors operate based on properties of light, their operational frequency range is limited.

In view of the above, the field of strain sensors was in need of a sensor design that employs a minimum of relatively inexpensive materials that exhibit superior mechanical properties, yet allow ready implementation in a variety of environments. Such a sensor should also minimize heat dissipation and not be limited in its range of applications. The sensor should be able to detect shear and normal forces acting on the object being sensed, and preferably provide a direct measurement without requiring any mechanical interface between the sensor and the object. Ideally, also, the sensor design should allow "tuning" capabilities according to particular sensing parameters, such as sensitivity and the like.

SUMMARY OF THE INVENTION

The preferred embodiment is directed to a solid-state capacitance strain sensor that operates based on variation of dielectric properties with deformation, which is called electrostriction. The sensor may be configured as a two-sided device according to the design of a conventional capacitor, or alternatively may be configured as a one-sided device as a line capacitor sensor. Moreover, the dielectric material employed in the sensor may be micro-tailored according to particular applications to increase sensitivity to, for example, shear or normal deformation. In one preferred embodiment, the dielectric is the object being sensed while appropriately placed electrodes measure capacitance changes in response to deformation of the object in response to incident forces. Such capacitance changes are caused by a change in the dielectric constant of the object being sensed as deformation due to forces, for example, shear and/or compressive, are exerted thereon.

According to a first aspect of the preferred embodiment, a solid-state capacitance sensor for measuring a strain force on a dielectric having a corresponding dielectric constant includes at least one pair of electrodes disposed so as to interface with the dielectric. Electrodes can be fixed and thus not moving upon deformation, or can be attached to the dielectric and move following the deformation. In addition, the sensor includes a measuring circuit coupled to the electrodes to measure a change in the dielectric constant in response to the deformation. In operation, the change in the dielectric constant is caused by an electrostrictive response of the dielectric to the strain. The response is quantified by computing a change in the dielectric constant based on a measured change in capacitance.

According to another aspect of this embodiment, the electrodes are fixed to the dielectric, and the measuring circuit determines the change in the dielectric constant by measuring a change in capacitance between the pair of electrodes and then computing the change in the dielectric constant. The strain can then be determined based on both the change in dielectric constant and the electrostriction parameters associated with the dielectric According to another aspect of the preferred embodiment, a method of sensing a strain includes the steps of providing at least one pair of electrodes separated by a selected distance. The method includes positioning the electrodes so that the electrodes are in close proximity with a dielectric having an associated dielectric constant. Then, a change in capacitance between the pair of electrodes is measured, and the method thereafter determines the strain force by computing a change in the dielectric constant based on the change in capacitance.

In another aspect of this embodiment, the determining step includes computing the strain based on the change in the dielectric constant and electrostriction parameters associated with the dielectric.

According to a still further aspect of the preferred embodiment, a solid-state sensor includes a dielectric defining a dielectric constant. Moreover, the sensor includes at least one pair of electrodes disposed so as to interface with said dielectric. In operation, the dielectric constant changes in response to a deformation acting on the dielectric (i.e., electrostriction response). Notably, this change in the dielectric constant is indicative of the deformation.

According to another aspect of this preferred embodiment, the dielectric includes a plurality of particles suspended in a polymer. In addition, the particles may define an anisotropic structure. Notably, the electroconduction properties of the particles are distinct from those of the polymer dielectric. For example, glass, alumina and iron particles in silicone rubber were successfully tested.

In yet another aspect of the preferred embodiment, a method of measuring strain includes the steps of providing a dielectric having a dielectric constant, and providing at least two electrodes in close proximity to the dielectric. The method then includes the step of measuring a change in capacitance across the electrodes in response to deformation of the dielectric. In operation, the dielectric exhibits an electrostrictive effect in response to the force and the change is caused at least in part by the electrostrictive effect.

According to another aspect of this preferred embodiment, the method further includes the step of determining a change in the dielectric constant of the dielectric based on said measuring step. Moreover, the method includes the step computing the strain based on the change in the dielectric constant and electrostriction parameters associated with the dielectric.

In an alternative aspect of the preferred embodiment, a method of producing a solid-state strain sensor includes the steps of providing a polymer melt, and mixing a plurality of particles with the melt. Then, the method includes exposing the melt having the suspended particles to an electric field and cross-linking the particles to form a composite.

According to another aspect of this embodiment, the exposing step includes exposing different regions of the melt to different electric fields corresponding to at least one selected sensing parameter. The at least one selected parameter could be any number of environmental, mounting or application parameters, for example, sensitivity to a shear force.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

The strain sensor of the preferred embodiment operates based on the electrostrictive response of a selected material to strain forces. As commonly known to those skilled in the art, electrostriction is a field-induced deformation (e.g., expansion or contraction) of a material. More particularly, electrostriction is a fourth rank tensor property relating mechanical strain to the square of the corresponding electric filed and is present in all materials. An equivalent definition of the electrostriction phenomenon is the effect of deformation on dielectric properties of the material. Electronic polarization of the atoms, molecules or mesoscopic inclusions of a subject material leads to the electrostrictive effect. It follows that because every material consists of atoms, every material is also electronically polarizable. This lends significant flexibility to the types of materials that may be used to fabricate the sensor of the preferred embodiment.

Figure 3:
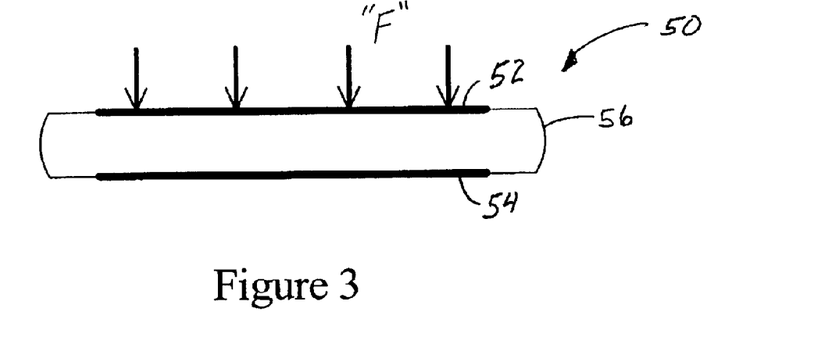
FIG. 3 is a solid-state capacitance sensor according to a preferred embodiment, illustrating a compressive load applied thereto.
Figure 4:
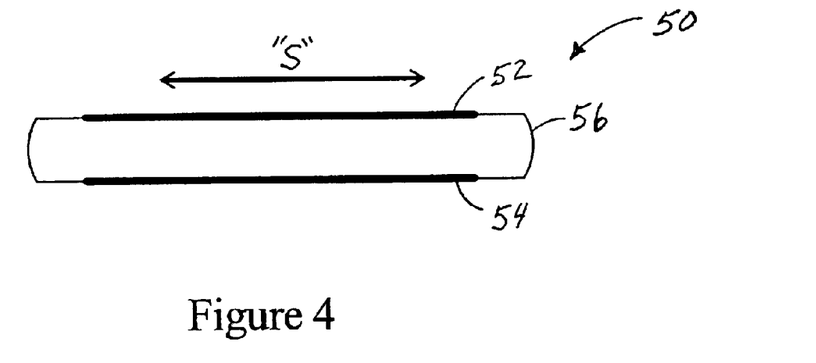
FIG. 4 is a solid-state capacitance sensor according to the preferred embodiment, illustrating a shear load applied thereto.

Turning initially to FIGS. 3 and 4, a solid-state capacitance sensor 50 that operates based on electrostriction is shown. Sensor 50 is a two-sided device arranged in a parallel plate configuration including a dielectric 56 having two opposed electrodes 52, 54 coupled thereto. Electrodes 52, 54 have a surface area "A" and in this embodiment, dielectric 56 is homogenous and isotropic. Electrodes 52, 54 are preferably rigid and define the parallel plates of the capacitance sensor such that strain forces can be detected by monitoring electrostrictive response of the dielectric to a stimulus. In particular, the electrostrictive response is manifested as a change in capacitance.

Sensor 50 is adapted for sensing strain in all directions, for example, in compressive and shear directions (as shown in FIGS. 3 and 4, respectively). In operation, as sensor 50 is subjected to a force directed as shown in either or both of FIGS. 3 and 4, the electrostrictive properties of dielectric 56 change. More particularly, as dielectric 56 is deformed, the polarization of the material changes. This change in polarization translates into a change in the dielectric constant of dielectric 56. In turn, the change in dielectric constant can be measured as a change in capacitance. In particular, the variation in capacitance is composed of a variation in the separation $\Delta h/h$, and a variation in the dielectric constant $\Delta \epsilon/\epsilon$, $$\Delta C/C = -\Delta h/h + \Delta \epsilon/\epsilon \qquad \text{Equation 1}$$

wherein $\epsilon$ is the at-rest dielectric constant of dielectric 56, and h is the thickness of dielectric 56 which also defines the separation between the parallel plates (i.e., electrodes 52, 54) of capacitive sensor 50. Note that the term "dielectric constant" is typically used to define an inherent property of an isotropic material. In anisotropic materials, dielectric properties vary with orientation of the materials' principal axis, and therefore such materials typically are characterized by an "apparent dielectric property." Therefore for case of discussion, the term "effective dielectric constant" will be used herein to refer to either the inherent property of an isotropic dielectric, or the apparent dielectric property of an anisotropic dielectric, a value that is typically formally obtained via experimental measurement.

For a two-sided sensor 50, the capacitance C in Equation 1 is defined by the following, $$C = \epsilon_0 \epsilon A/h \qquad \text{Equation 2}$$

where $\epsilon_0 = 8.85 \times 10^{-12}$ F/m which is the permittivity of free space, A is the surface area of parallel electrodes 52, 54, and h is the separation between electrodes 52, 54, i.e., thickness of dielectric 56. Notably, fringe effects have been ignored in Equation 2. With the at-rest capacitance known, and $\Delta C$ can be determined, $$\Delta C = -(\Delta h/h + \Delta \epsilon/\epsilon) \times C \qquad \text{Equation 3}$$

Again, a measured change in capacitance may be due to a combination of a change in separation between the parallel plate electrodes 52, 54, $\Delta h$, and a change in the dielectric constant of dielectric 56, $\Delta \epsilon$.

Notably, in response to displacement due to a shear force "S" (FIG. 4), a measured change in capacitance is due only to a change in the dielectric constant of dielectric 56 as the change in separation $\Delta h/h$ is zero and thus drops out of Equation 3. On the other hand, with respect to the compressive force "F" illustrated in FIG. 3, a measured change in capacitance is due to both a change in separation between electrodes 52, 54 and a change in the dielectric constant of dielectric 56. In the event that only normal deformation is being measured (for example, the sensor may be designed such that the electrodes are constrained to only normal displacements or so that it is disposed such that it only experiences normal deformation), then $$\Delta\epsilon/\epsilon = -K \times \Delta h/h \qquad \text{Equation 4}$$

where "K" is a known coefficient that is obtained in conventional fashion, preferably experimentally or calculated based on (1) electrostrictive and elastic properties of the dielectric material, and (2) the boundary conditions including the manner in which the dielectric is attached to the substrate or embedded in the operative environment. Overall, as compared to known air-gap sensors such as those shown in FIGS. 1 and 2, the preferred embodiment, by accounting for $\Delta\epsilon/\epsilon$, enhances the sensitivity of sensor response, and enhances the sensor tolerance to mechanical overloads.

Figure 5:
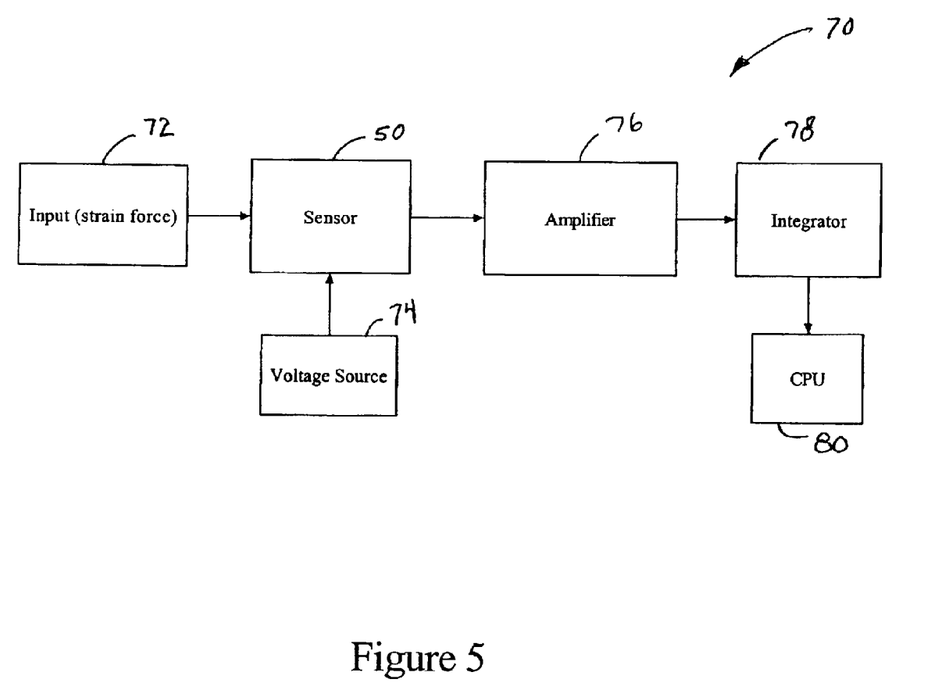
FIG. 5 is a schematic circuit diagram for measuring strain forces, according to the preferred embodiment.

Turning to FIG. 5, a circuit 70 for measuring strain forces on a dielectric (52 in FIGS. 3 and 4) by monitoring electrostrictive effects on capacitance according to the preferred embodiment is shown. Initially, for a given sensor 50, "A" and "h" can be computed, and thus capacitance, C, of the sensor at rest is known. Then, in operation, when subjected to an external stimulus 72, the change in capacitance is measured as follows. A conventional voltage source 74 electrically coupled to electrodes 52, 54 is used to apply a voltage, V, across dielectric 56. With capacitance, C, being known and the voltage being constant, the charge "q" can be determined according to, $$q = C \times V \qquad \text{Equation 5}$$

In response to the stimulus (e.g., a compressive or shear force), the capacitance of sensor 50 changes. With voltage remaining constant, the charge "q" must change to maintain the C-V relationship, C=q/V. This change in charge manifests itself in the form of a transient current. The output signal from sensor is transmitted to an amplifier 76 prior to further processing. As is appreciated, "q" is the integral of the current, and therefore an integrating circuit 78 is employed to integrate the amplified current signal to determine the charge, i.e., to compute the new q, $q_{new}$. This charge signal is then transmitted to a microprocessor 80 for storage and determination of the properties of the force causing the capacitance change as described below. By knowing $q_{new}$, a new C can be computed via Equation 5. The change in capacitance, $\Delta C$ can then be determined by, $$\Delta C = C - C_{new} \qquad \text{Equation 6}$$

The change in C, $\Delta C$, can then be used in Equation 3 to determine the change in the dielectric constant of dielectric 56, $\Delta\epsilon$, where $\Delta h/h$ is zero for a shear force (FIG. 4), $$\Delta\epsilon = -\Delta C/C \times \epsilon \qquad \text{Equation 7}$$

Knowing $\Delta\epsilon$ (i.e., the electrostriction effect), the corresponding shear force can be determined, as described in further detail below. Of course, any conventional method of capacitance detection, direct or indirect, may be employed to determine C.

On the other hand, for a purely compressive force (FIG. 3), when solving for $\Delta h/h$ in Equation 4, $$\Delta h/h = -1/K \times \Delta\epsilon/\epsilon \qquad \text{Equation 8}$$

and thus Equation 3 becomes, $$\Delta C = \Delta\epsilon/\epsilon(1/K - 1) \times C \qquad \text{Equation 9}$$

and further solving for $\Delta\epsilon$, $$\Delta\epsilon = \Delta C/C \times \epsilon/(1/K - 1) \qquad \text{Equation 10}$$

This change in the dielectric constant due to the electrostriction effect can then be used to determine the strain force.

Next, the strain force can be determined as follows. Depending on whether dielectric 56 is isotropic or anisotropic, the term $\Delta\epsilon/\epsilon$ is defined differently. For isotropic dielectric materials (i.e., materials whose physical properties are the same whatever direction they are observed), the term $\Delta\epsilon/\epsilon$ is defined as follows. The normal deformation $u_{33}$ (i.e., compressive force) of a constrained isotropic dielectric changes the corresponding dielectric constant according to the following equation:

$$\Delta\epsilon = (\alpha_1 + \alpha_2) u_{33} \qquad \text{Equation 11}$$

where the parameters $\alpha_1$ and $\alpha_2$, define deformation effects on the dielectric constant, as well as the electric field-induced stress in dielectric materials. Parameters $\alpha_1$ and $\alpha_2$ are called electrostriction parameters. The preferred embodiment employs an experimental estimation of these parameters. At the same time, a theoretical model for isotropic composites predicts electrostriction parameters $\alpha_1$, $\alpha_2$ through a dielectric constant of the continuous phase material according to the following equations, $$\alpha_1 = -2/5 \times ((\epsilon - \epsilon_c)^2) \epsilon/\epsilon_c), \text{ and} \qquad \text{Equation 12}$$

$$\alpha_2 = -((\epsilon - \epsilon_c)(\epsilon + 2\epsilon_c)/3\epsilon_c + 2/15(\epsilon - \epsilon_c)^2/\epsilon_c \qquad \text{Equation 13}$$

With $\alpha_1$ and $\alpha_2$ known in this fashion, a measured change in capacitance due at least in part to a change in the dielectric constant of dielectric 56 (i.e., electrostriction) can be directly related to force $u_{33}$ to determine the amount of strain. Notably, for such an isotropic dielectric, shear forces are resolved in the same fashion using the same electrostriction parameters, $\alpha_1$ and $\alpha_2$, as expected.

For uniaxially anisotropic materials (or transverse isotropic), the term $\Delta\epsilon/\epsilon$ differs from isotropic materials in direction, as defined by a unit vector "d" and the plane perpendicular to "d." Such materials have a second order dielectric tensor of the form, $$\epsilon_{ik} = \epsilon \delta_{ik} + (\epsilon^{\parallel} - \epsilon) d_i d_k \qquad \text{Equation 14}$$

wherein $\epsilon_{\parallel}$ and $\epsilon$ are the relative dielectric constants for probing fields applied parallel and perpendicular to d, respectively. The strain-dependent dielectric tensor requires six phenomenological electrostriction coefficients $\alpha_1 - \alpha_6$. These material properties are scalar functions of thermodynamic variables, such as the temperature, the electric field magnitude, and the density. The effect of normal deformation on $\Delta\epsilon = \epsilon_{33} - \epsilon^{\parallel}$ and the normal stress of the transverse isotropic materials are $$\Delta\epsilon_{33} = K_n u_{33}, \text{ and } \sigma_{33}^{elect} = \epsilon_0 E^2/2 \{\epsilon^{\parallel} - K_n\},$$

$$K_n = \alpha_1 + \alpha_2 + \alpha_3 + \alpha_4 + \alpha_5 + \alpha_6, \qquad \text{Equation 15}$$

where deformation effects on polarization and normal stress are both determined by the same parameter $K_n$. Given that the strain tensor is defined as, $$u_{ik} = \frac{1}{2} \times (\delta u_i \delta x_k + \delta u_k/\delta x_i + \delta u_l/\delta x_i \times \delta u_l/\delta x_k) \qquad \text{Equation 16}$$

deformation caused by shear displacement $U_2 = \gamma x_3$ yields for three (3) non-zero strain components $u_{13} = u_{31} = \gamma/2$ and $u_{33} =$ $\gamma^2/2$. Thus, $\Delta\epsilon$ and shear stress $\sigma_{13}$ of transverse isotropic materials are $$\Delta\epsilon=(K_\tau+K_n)\gamma^2/2, \text{ and } \sigma_{13}^{elect}=(\epsilon_0 K_\tau E^2/2)\times\gamma, \quad \text{Equation 17}$$

where, $$K_\tau=\epsilon^{\|}-\epsilon^{\perp}-\alpha_3-\alpha_4-\alpha_6. \quad \text{Equation 18}$$

Figure 9:
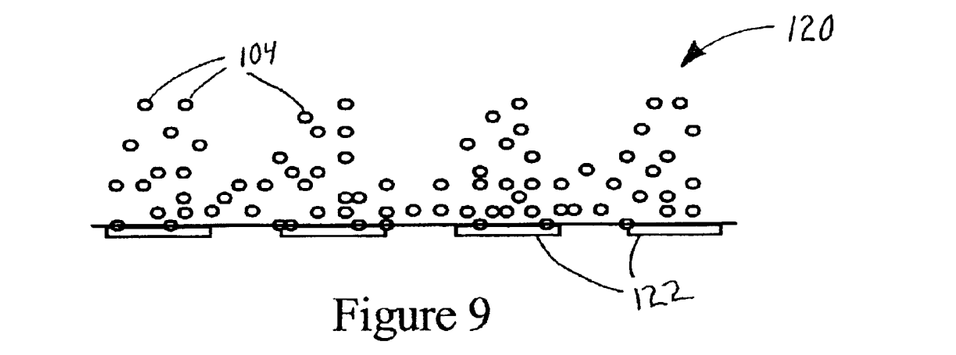
FIG. 9 is a cross-sectional front elevation view of an anisotropic dielectric employed in the sensor of the preferred embodiment, illustrating a bow structure.

A theoretical model of isolated chains (as described further below) predicts parameters $K_n$ and $K_\tau$ as, $$K_n=-(\epsilon^{\|}-\epsilon_c[1+3\xi/(1-\xi)], K_\tau=2(\epsilon^{\|}-\epsilon^{\perp})+(\epsilon^{\|}-\epsilon_c)\xi/(1-\xi)\epsilon^{19} \quad \text{Equation 19}$$

where, $$\xi=\tfrac{1}{2}\times(\epsilon_p-\epsilon_c)/(\epsilon_p-2\epsilon_c)\times\zeta(3)(a/l)^3, \zeta(3)=1.202 \quad \text{Equation 20}$$

and where $\epsilon_p$ and $\epsilon_c$ are dielectric constants of inclusions and the continuous phase material, respectively, a is the particle diameter (described below) and l is the distance between centers of particles, for example, in a chain-like structure (FIG. 9). In general, however, the coefficients relating to the relationship between the change in the dielectric constant and the detected force are determined experimentally. Note that "particulate phase" is used herein to define a material in the form of isolated inclusions or particles (e.g., iron or alumina particles) surrounded by another material, the "continuous phase" material, such as silicone rubber.

Figure 6:
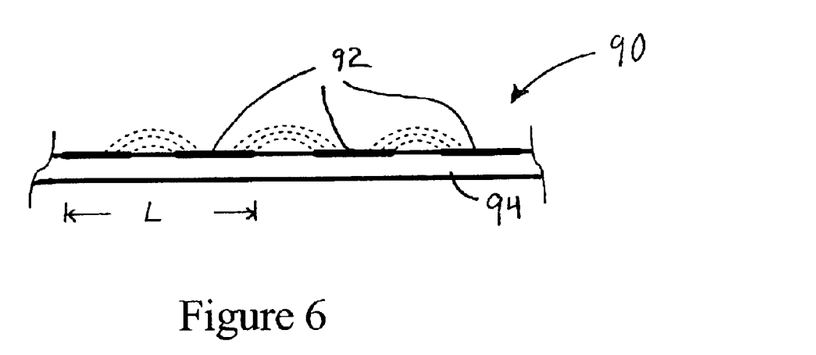
FIG. 6 is a cross-sectional front elevation view of a line capacitance (one-sided) sensor according to the preferred embodiment.

Turning next to FIG. 6, an alternate embodiment to two-sided sensor 50 shown in FIGS. 3 and 4 is a single sided electrorestrictive capacitance sensor 90. Sensor 90 includes at least two electrodes 92 placed on, for example, a substrate 94. In this arrangement, sensor 90 can measure forces impinging upon substrate 94 which operates as the dielectric, or a material that comes into contact with electrodes 92. For example, in an injection molding application, the at least two electrodes 92 may be placed on an inside surface of the mold while the melt flows through the mold and in contact with electrodes 92. In process, forces acting on the melt are measured in response to changes in the electrostrictive properties of the melt. In particular, forces are measured by monitoring the changes in capacitance over adjacent pairs of electrodes 92.

More particularly, for single-sided sensor 90, the capacitance is defined by, $$C=(\epsilon_0\times\epsilon\times L\times\ln 2)/\pi \quad \text{Equation 21}$$

where L is the total length of an adjacent pair of electrodes, as shown in FIG. 6. Note that this expression for capacitance is approximate, but sufficient for estimating the response. A more preferred calculation of capacitance is provided by a finite element algorithm, as is conventional in the art. In any event, noting the $\Delta h$ is zero and the electrodes are fixed, $\Delta C/C=-\Delta\epsilon/\epsilon$. Therefore, the change in capacitance defined in Equation 3 becomes, $$\Delta C=-\Delta\epsilon/\epsilon\times C \quad \text{Equation 22}$$

Then using the same circuit as in FIG. 5, with "C" being known, and the applied voltage being constant, the at-rest charge "q" can be computed. When an external stimulus (e.g., a compressive or shear strain force) is detected, the capacitance of sensor 90 changes. With voltage remaining constant, the charge "q" must change to maintain the C-V relationship, C=q/V. This change in charge manifests itself in the form of a transient current. The output signal from sensor is transmitted to and amplified by amplifier 76 prior to further processing. As is appreciated, "q" is the integral of the current, and therefore, the integrating circuit 78 is used to integrate the amplified current signal to determine the charge, i.e., to compute the new q, $q_{new}$. This charge signal is then transmitted to a microprocessor 80 for storage and determination of the properties of the force causing the capacitance change, as described previously. By knowing $q_{new}$, a new C can be computed via Equation 5. The change in C can then be determined using Equation 6.

The change in C, $\Delta C$, can then used in Equation 3 to determine the change in the dielectric constant of the dielectric, $\Delta\epsilon$. For a shear force (FIG. 4), where $\Delta h/h$ is zero, Equation 7 can be used to determine $\Delta\epsilon$. On the other hand, for a purely compressive force (FIG. 3), $\Delta\epsilon$ is as defined in Equation 10. This change in the dielectric constant due to the electrostriction effect can then be used to detect the strain force, as discussed above.

Figure 7:
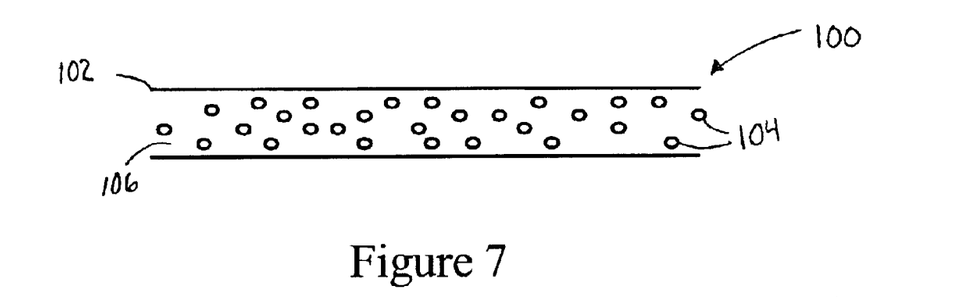
FIG. 7 is a cross-sectional front elevation view of an isotropic dielectric employed in the sensor of the preferred embodiment.

As described previously, the dielectric employed in the preferred embodiment may be isotropic or anisotropic. A dielectric composed of an isotropic composite 100 is shown in FIG. 7. Preparation of dielectric 102 can be as follows. Particles 104 having particular diameters are mixed with a base prepolymer of silicone elastomer 106 and then degassed in a vacuum chamber. The volume fraction of the particles suspended in the rubber is in a range of about 2%–20%. After adding a cross-linking agent and a catalyst, the mixture is then evacuated for approximately ten (10) minutes and transferred to a set of casting cells resembling parallel plate capacitors with a gap approximately equal to one milimeter. The mixture is then solidified, which may be effectuated by allowing time for the mixture to cure, and/or using temperature control. Alternatively, some polymers can be melted and cooled down—like nylons and thermoplast, or the selected polymer can be dissolved and later cured by vaporizing the solvent. Still other materials like silicone rubber or epoxy are solidified by mixing a prepolymer and an actuator (e.g. chemical agent which starts a polimerization reaction), and depending on the composition will start polimerization reactions with time, elevated temperature, UV light, etc. Once set, the composite structure 100 provides an isotropic dielectric with a random distribution of particles or inclusions as shown in FIG. 7. The particles are preferably iron (diameter less than 45 microns) or alumina (diameter less than 100 microns). Notably, it is the difference between the electroconductive properties of the particles and the polymer dielectric that can enhance the electrostrictive effect, and otherwise lend flexibility to the range of sensor applications and types of forces that can be detected.

Figure 8:
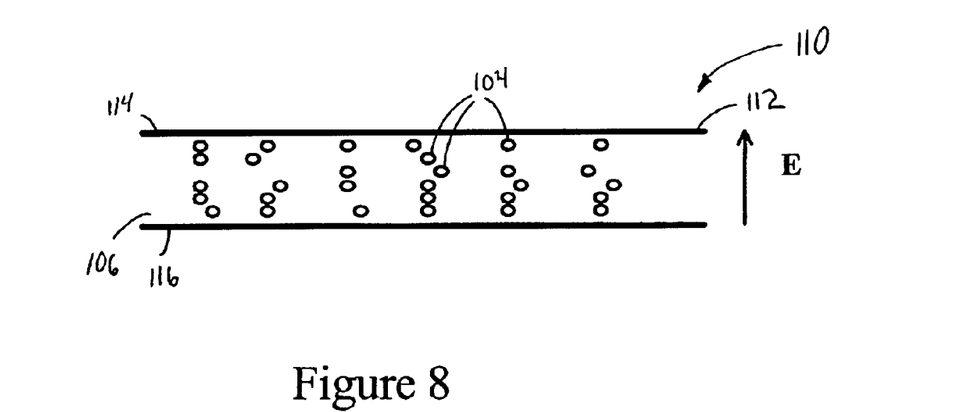
FIG. 8 is a cross-sectional front elevation view of an anisotropic dielectric employed in the sensor of the preferred embodiment, illustrating a chain-like structure.

Alternatively, the composite with aligned particles can be tuned in the cells by exposing the dielectric to an electric field during process. In FIG. 8, a composite 110 having a chain-like structure is produced for a two-sided sensor having parallel plate electrodes 114, 116 (FIGS. 3 and 4). For example, the process may include maintaining an orthogonal electric field of approximately 1.5 kV/mm at a frequency equal to about 100 Hz during the curing time. In this case, a 1 M$\Omega$ blocking resistor is preferably connected in series with the casting cells.

Figure 11:
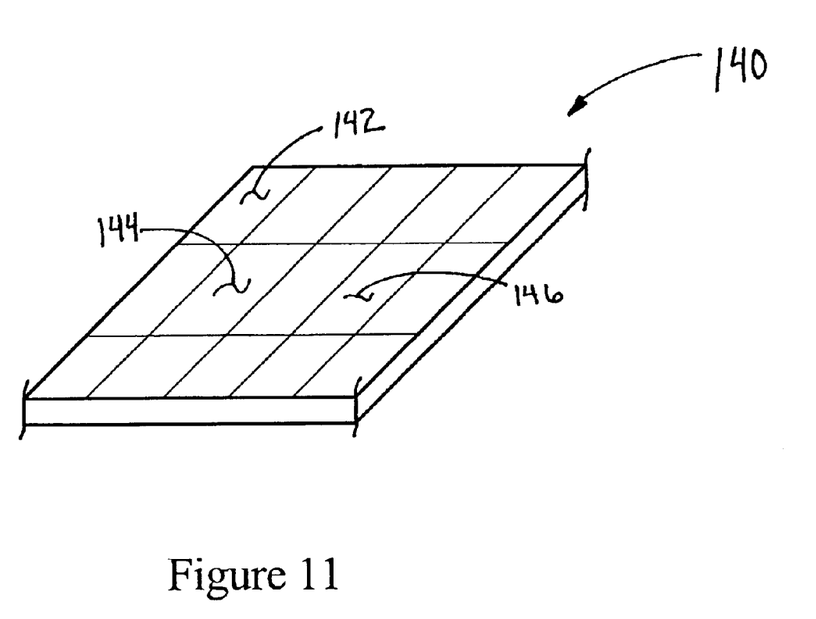
FIG. 11 is a partially broken away perspective view illustrating an example of an array of sensors, according to the preferred embodiment.

More particularly, in process, the field strength is approximately 1–10 MV/m, while the field lines may be oriented in any of several directions. For example, the field may be directed perpendicularly to the measuring electrodes, in the form of semicircles for a single-sided device having single side electrodes, etc. When employing a dielectrically anisotropic material, the material will react differently in response to different deformations, e.g., shear or normal deformations. One aspect of this invention is that we can form an array of sensors 140 (which may be contiguous) with sets of electrodes interfacing the dielectric material, whereby the principal axis of the dielectric varies from one element of the array to another, as shown in FIG. 11. Such a configuration permits the user to distinguish between different directions of the shear deformations and between shear and normal deformations. For example, array 140 includes an isotropic sensor section 142, a chain-like sensor section 144, a bow-like sensor section 146, etc., which may or may not comprise one contiguous composite that is tuned accordingly.

Figure 12:
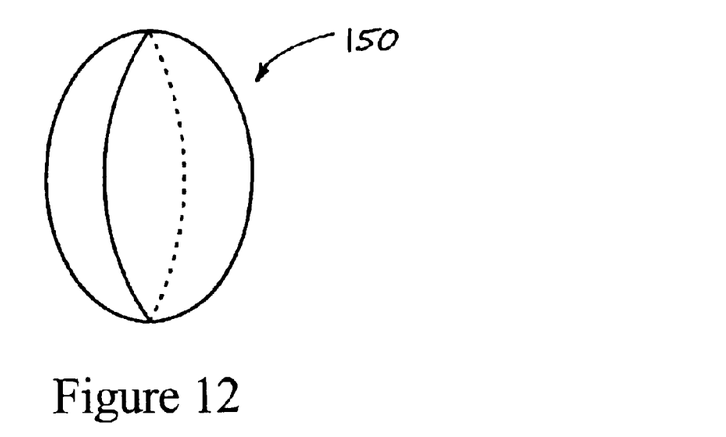
FIG. 12 is a perspective view illustrating oblate particles used to produce an anisotropic dielectric, according to the preferred embodiment.
Figure 13:
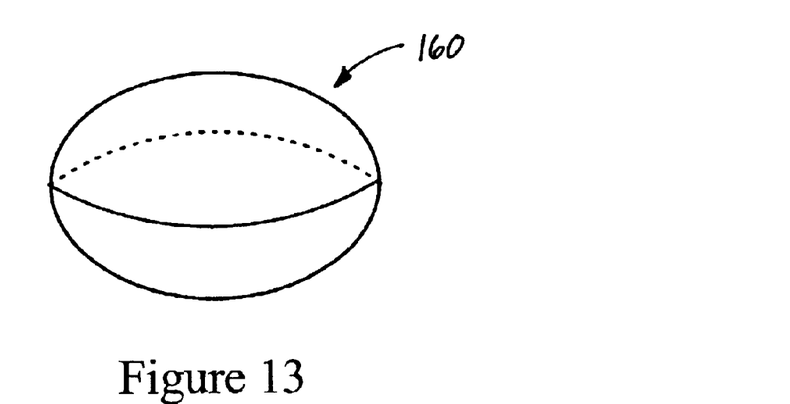
FIG. 13 is a perspective view illustrating prolate particles used to produce an anisotropic dielectric, according to the preferred embodiment.
Figure 14:
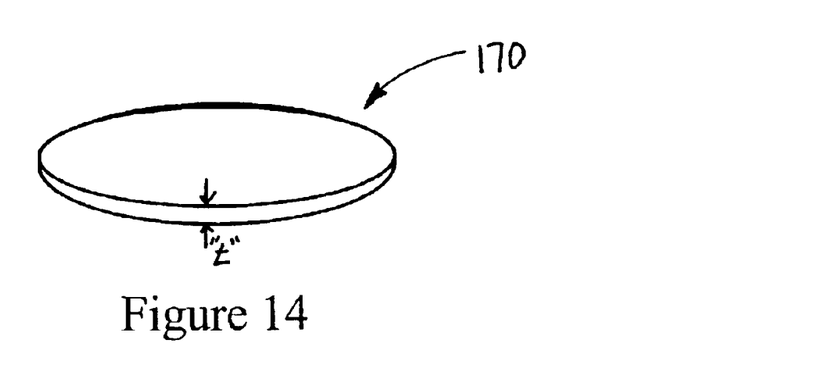
FIG. 14 is a perspective view illustrating disk-shaped particles used to produce an anisotropic dielectric, according to the preferred embodiment.

Again, methods to create dielectrically anisotropic structures using an electric field include forming chains of particles in desirable directions (FIG. 8), or otherwise orienting non-spherical particles in a desirable direction. Moreover, preferred particle sizes include spherical iron particles, and alumina particles with diameter sizes in a range of about 45–100 microns. Alternatively, oblate particles (a "squashed" sphere 150, an ellipse rotated about its minor axis, as shown in FIG. 12), or prolate particles (a "pointed" sphere 160, an ellipse rotated about it major axis, as shown in FIG. 13) may be used to increase sensor sensitivity. Disk-like particles 170 may also be employed (e.g., approximately 10 angstroms in thickness, t, and 200 angstroms in diameter, d), as shown in FIG. 14.

A chain-like structure of electrorheolgical (ER) composites, such as that shown in FIG. 8, enhance their electrostriction response to normal and shear deformations. This makes them particularly useful for fully integrated and embedded ER device sensor solutions, as well as for stand-alone sensing systems. High sensitivity of anisotropic composites to shear electrostriction can be utilized for vibration control in various "smart" bushing systems and for shear stress/strain sensor applications such as robot grasping.

Alternatively, for a one-sided sensor 120 having electrodes 122 disposed on one side of the dielectric material, a bow-like structure results, as shown in FIG. 9. This tailoring is achieved using the apparatus shown in FIG. 10. In each case, the resulting sensor achieves greater sensitivity to shear forces. One notable application is to embed the two-sided sensor shown in FIG. 8 in a robotic glove. As a result, a robust sensor having the desired shape, force tolerance and flexibility can be achieved.

Figure 10:
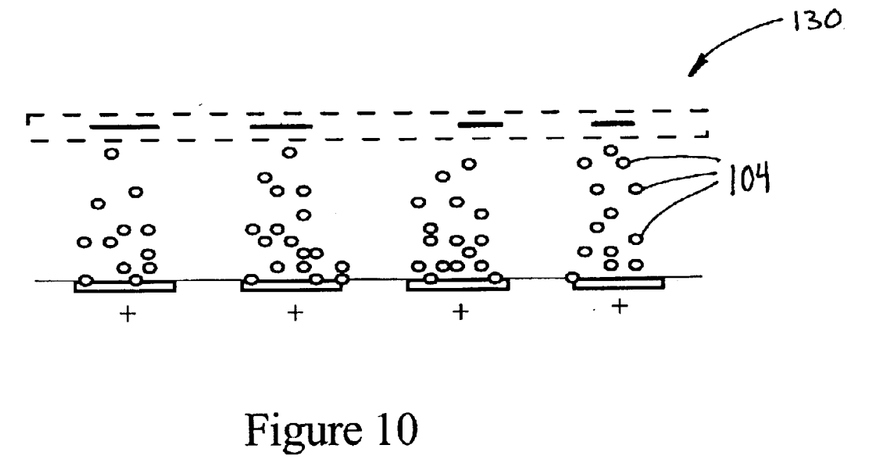
FIG. 10 is a cross-sectional front elevation view of a mirco-tailored anisotropic dielectric of the sensor of the preferred embodiment.

Overall, microtailoring composites for use as the dielectric of the preferred embodiment, as shown in FIGS. 8–10, can provide flexibility in a variety of sensing environments. Notably, different portions of the composite 130 (FIG. 10) can be exposed to a different field based on, for example, the type of forces being sensed (shear/strain, low/high, etc.), environment, or a particular sensing parameter such as sensitivity to force in a particular direction, etc.

Moreover, as suggested previously, applications can be multi-dimensional. In one instance, an embedded torque sensor could be implemented. In this case, the sensor is detecting one dimensional forces, in contrast to the two dimensional parallel plate configuration discussed previously. Other applications include implementing the sensor in an environment in which forces in three dimensions require detection. Although capacitive based, as the sensors described above, the electrodes disposed in such an environment can be oriented so as to provide sensing in three orthogonal directions. A three dimensional sensor could comprise a sphere with interdigitated electrodes placed around the surface of the sphere which is made of a selected dielectric that exhibits a known eletrostrictive response. In this case, the spherical shell could house a steel ball, for instance, and detect three dimensional forces exerted on the dielectric by the steel ball while in operation.

In each case, the sensor takes advantage of the electrostrictive properties of a selected dielectric by monitoring the capacitance changes in response to the forces being detected. As appreciated by those in the art, a myriad of applications is possible due to the fact that any dielectric implemented in the sensor exhibits an electrostrictive response which can be monitored as described herein.

Next, rather than using composites, mixtures or suspensions, as the continuous phase dielectric material, materials that have effectively the same morphology (i.e., structure) may be employed in the preferred embodiment. From polymer chemistry, all thermoplast resins are so-called block co-polymers which means that each polymer chain consists of two segments—one segment (A) is a liquid polymer under normal conditions and another segment (B) is a solid polymer under normal conditions. When cooling down from a melt or condensed from a solvent, segments (B) from different chains are attached to each other to form microcrystals. Effectively, a solid-like cross-linked structure, called resin, rubber, thermoplast, etc. results. This can be generally equated to particles (microcrystal (B)) that are dissolved in a polymer (liquid polymer (A)), as in the previously described structure. Some block co-polymers may have a few metal radicals attached to the chains. As a result, these radicals will form metal clusters, which are equivalent to the composites described previously.

Also, although organic continuous phase material may be used, synthesized polymers (where carbon is replaced with silicone) may be employed. For example, silicone rubber may be used as well, which is particularly advantageous for biomedical applications where silicon rubber is often used. Other inorganic materials include silicone oxide, different types of glass, etc.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. A solid-state sensor comprising:
   a dielectric material defining an effective dielectric constant;
   at least one pair of electrodes disposed so as to interface with said dielectric; and
   wherein an effective dielectric constant changes in response to a deformation of said dielectric material, and wherein an amount of the change in said dielectric constant is indicative of an amount of the deformation such that the sensor is self-sensing; and, the amount of deformation is based substantially only on the change in said dielectric constant.

2. The sensor of claim 1, wherein said electrodes are fixed and mechanically decoupled from the dielectric such that said electrodes do not move in response to the deformation and corresponding deformation of said dielectric material.

3. The sensor of claim 2, wherein the sensor is a single-sided device.

4. The sensor of claim 2, wherein the dielectric material is anisotropic.

5. The sensor of claim 1, wherein said electrodes are displaced upon deformation of the dielectric.

6. The sensor of claim 1, wherein the dielectric material is anisotropic.

7. The sensor of claim 6, wherein the dielectric is a composite with particulate phase defining a chain-like structure.

8. The sensor of claim 7, wherein the particles have an oblate or prolate shape and are oriented in a particular direction.

9. The sensor of claim 1, wherein said dielectric material is elastic or viscoelastic.

10. The sensor of claim 9, wherein the dielectric is one of a group consisting of: a liquid viscoelastic material polymer melt, a solution including biological or polymeric macromolecules, concentrated suspension.

11. The sensor of claim 1, wherein the sensor can measure strain/stress in any direction.

12. The sensor of claim 11, wherein the dielectric material is anisotropic and defines a plurality of regions, and wherein at least two of the regions have a different anisotropy.

13. The sensor of claim 1, wherein said electrodes are mounted to a single surface.

14. A method of measuring strain comprising:

providing a dielectric having a dielectric constant;

providing at least two electrodes disposed so as to interface the dielectric;

measuring an amount of a change in capacitance across the electrodes based only on a deformation of the dielectric; and wherein the dielectric exhibits an electrostrictive effect in response to the deformation and the change is caused only by the electrostrictive effect such that the sensor is self-sensing; and, the amount of deformation is based substantially only on the change in said dielectric constant.

15. The method of claim 14, wherein the dielectric comprising a stand-alone sensor.

16. The method of claim 14, wherein the dielectric comprising a member in which strain/stress is measured.

17. The method of claim 14, wherein the deformation is one of a group including a normal deformation and a shear deformation.

18. The method of claim 14, wherein the dielectric is anisotropic.

19. The method of claim 18, wherein the dielectric is tuned to have a chain-like structure.

20. The method of claim 18, wherein the dielectric is tuned to have constituent particles having an oblate or prolate shape oriented in a selected direction.

21. The method of claim 14, wherein said measuring step includes determining a change in the dielectric constant of the dielectric.

22. The method of claim 21, further including the step of computing the strain/stress force based on the change in the dielectric constant and electrostriction parameters associated with the dielectric.

23. A solid-state capacitance sensor for measuring a strain/stress force on a dielectric having a corresponding dielectric constant, the sensor comprising:

at least one pair of electrodes disposed adjacent to the dielectric;

a measuring circuit coupled to said electrodes to determine an amount of a change in the dielectric constant in response to the strain/stress force; and wherein the change in the dielectric is caused by an electrostrictive response of the dielectric to the strain/stress force, and wherein the measured strain/stress force is based only on the electrostrictive response of the dielectric and is generally independent of a spacing between said electrodes.

24. The sensor of claim 23, wherein the dielectric is anisotropic.

25. The sensor of claim 24, wherein the dielectric includes a chain-like structure.

26. The sensor of claim 23, wherein said electrodes are fixed to the dielectric.

27. The sensor of claim 23, wherein said electrodes are fixed and mechanically decoupled from the dielectric.

28. The sensor of claim 23, wherein the sensor is a one-sided device.

29. The sensor of claim 23, wherein said measuring circuit determines the change in the dielectric constant by measuring a change in capacitance between said pair of electrodes.

30. The sensor of claim 29, wherein the strain/stress force is determined based on the change in the dielectric constant and electrostriction parameters associated with the dielectric.

31. A method of sensing a strain/stress force comprising:

providing at least one pair of electrodes separated by a selected distance;

positioning the electrodes so that the electrodes are in generally continuous contact with a dielectric having an associated dielectric constant;

measuring a change in capacitance between the pair of electrodes; and determining the strain/stress force by only computing a change in the dielectric constant based on the change in capacitance such that the sensor is self-sensing; and, the amount of deformation is based substantially only on the change in said dielectric constant.

32. The method of claim 31, wherein said determining step includes computing the strain/stress force based on the change in the dielectric constant and electrostriction parameters associated with the dielectric.

* * * * *